United States Patent [19]

Borner

[11] Patent Number: 4,790,488
[45] Date of Patent: Dec. 13, 1988

[54] UTENSIL FOR CUTTING FOOD MATERIALS

[76] Inventor: Alfred Borner, Neustr., D 5565 Niederkail, Fed. Rep. of Germany

[21] Appl. No.: 58,175

[22] Filed: Jun. 4, 1987

Related U.S. Application Data

[63] Continuation-in-part of Ser. No. 817,040, Jan. 8, 1986, abandoned.

[51] Int. Cl.[4] ............................................. A47J 43/25
[52] U.S. Cl. ................................. 241/95; 30/279 R; 241/168; 241/273.1
[58] Field of Search ................. 241/168, 273.1, 273.4, 241/274, 95; 83/856, 858; 30/279

[56] References Cited

U.S. PATENT DOCUMENTS

| | | | |
|---|---|---|---|
| 131,787 | 10/1872 | Sawyer et al. | 83/856 X |
| 411,568 | 9/1889 | Becker | 30/279 R |
| 725,262 | 4/1903 | Lallement | 30/279 R |
| 1,834,717 | 12/1931 | Knapp | 241/273.1 |
| 1,845,522 | 2/1932 | Rowley. | |
| 2,447,714 | 8/1948 | Richards. | |
| 4,587,734 | 5/1986 | Johnson et al. | 30/279 R |

FOREIGN PATENT DOCUMENTS

| | | |
|---|---|---|
| 195823 | 2/1908 | Fed. Rep. of Germany. |
| 647464 | 7/1937 | Fed. Rep. of Germany. |
| 3009213 | 9/1981 | Fed. Rep. of Germany. |
| 3112074 | 10/1982 | Fed. Rep. of Germany ... 241/273.1 |
| 634732 | 11/1927 | France. |
| 48652 | 6/1966 | German Democratic Rep.. |
| 18605 | 8/1899 | Switzerland ..................... 30/279 R |
| 349346 | 5/1931 | United Kingdom ............ 241/273.1 |

*Primary Examiner*—Frank T. Yost
*Attorney, Agent, or Firm*—Scully, Scott, Murphy & Presser

[57] ABSTRACT

A kitchen utensil for cutting vegetables, in particular potatoes, into strips. The kitchen utensil comprises a base plate, which has provided on the upper side thereof at least one slide surface and, when seen in the direction of cutting, behind said slide surface, knives, which are open towards the underside of the base plate and the height of which projects beyond that of said slide surface. The knives are arranged in transverse rows, which are displaced relative to each other, and are provided with U-shaped cutting edges.

22 Claims, 4 Drawing Sheets

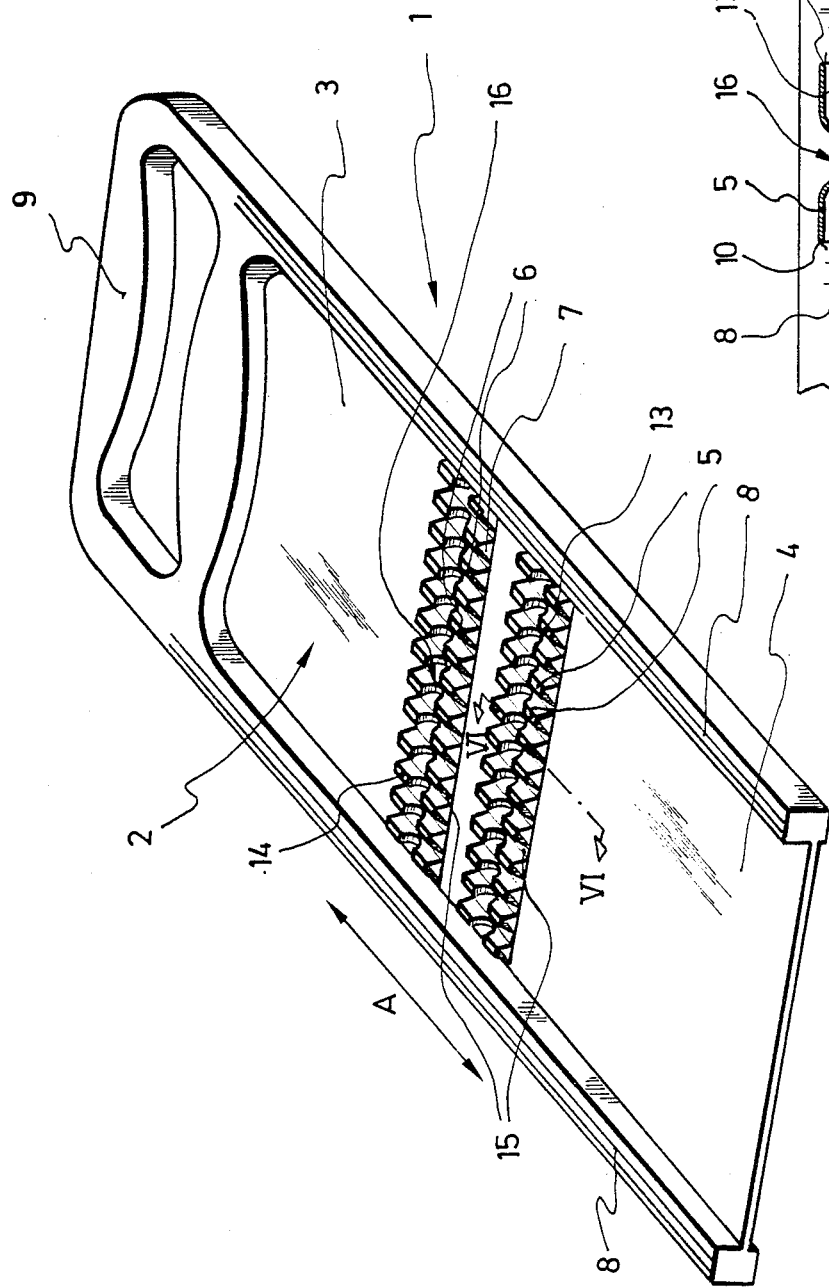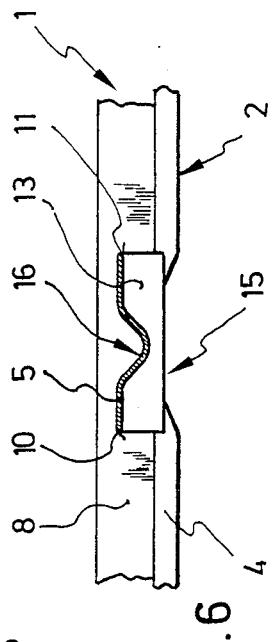
FIG. 5
FIG. 6

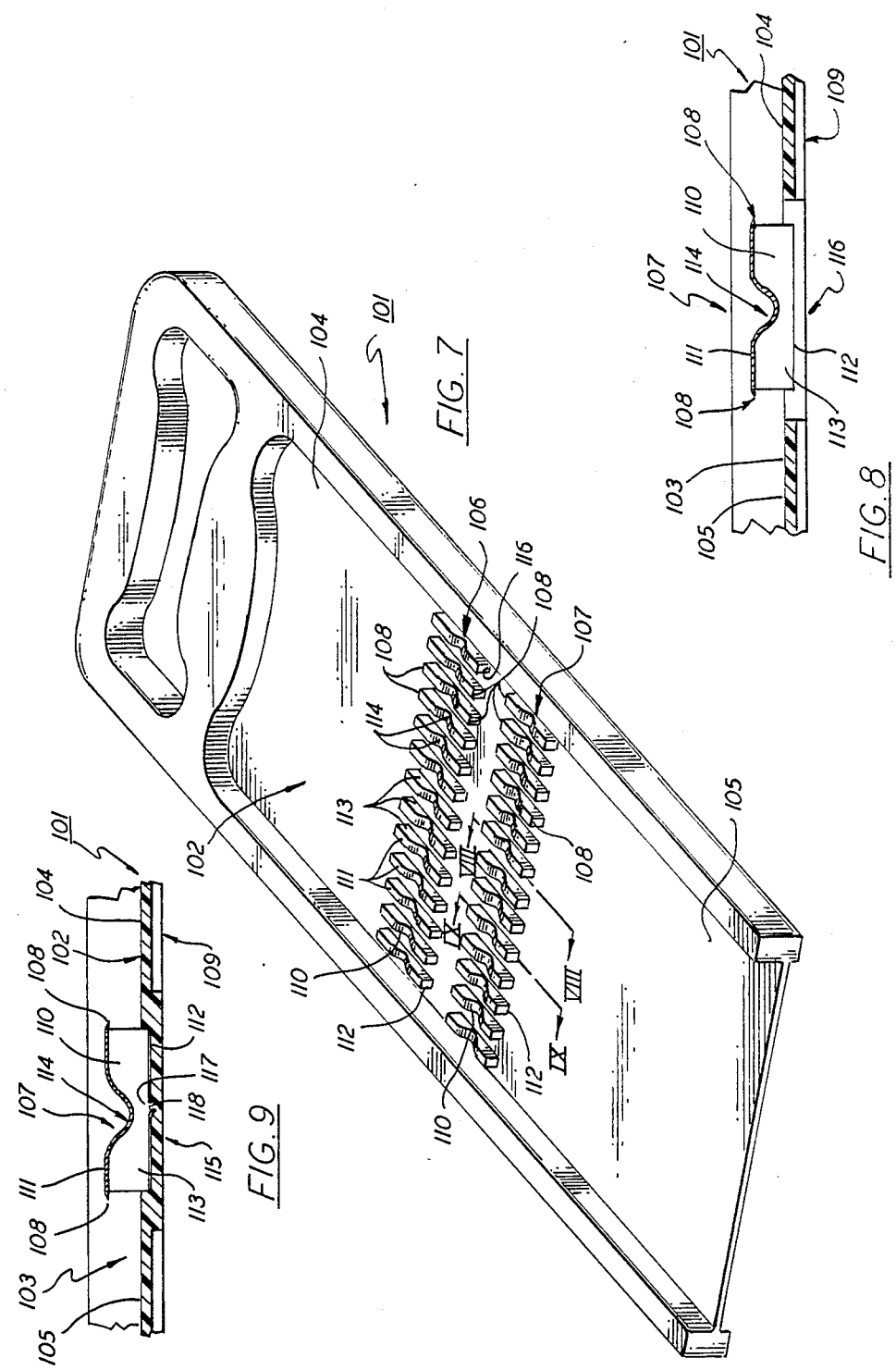

UTENSIL FOR CUTTING FOOD MATERIALS

BACKGROUND OF THE INVENTION

This application is a continuation-in-part of prior application Ser. No. 817,040, filed Jan. 8, 1986, now abandoned.

The present invention relates to a kitchen utensil for cutting vegetables, in particular potatoes, into strips. The kitchen utensil comprises a base plate, which has provided on the upper side thereof at least one slide surface, and a multitude of knives that, when viewed in the direction of cutting are located behind the slide surface. The knives are open towards the underside of the base plate and project above the slide surface. The knives are arranged in transversly extending rows, which are displaced relative to each other; and the knives are provided with U-shaped cutting edges, and the undersides of the knives are inclined towards the base plate from the cutting edge to the end of the knife.

Such kitchen utensils are used for preparing potato fritters, raw vegetable salads and the like. A kitchen utensil of this general type is known from German Offenlegungsschrift No. 30 09 213. The utensil described in this Offenlegungsschrift comprises scoops of trapezoidal cross section which are used for grating an object. These scoops are distributed such that they define a plurality of transverse rows extending almost to an end of the base plate in the direction of cutting.

The potato strips which can be produced by means of the known grater are far from perfect, since the potatoes are only partially cut by the scoops of the last transverse rows and since the strips thus produced are not cut off. When the potato is again moved over the grater, part of the partially cut strips will take a position in front of and at right angles to the scoop openings and will be cut through, consequently, or they will again be driven into a scoop in the longitudinal direction so that they will be cut through longitudinally a second time. This will result in non-uniform cut material as well as in a great risk of clogging of the grater. Morever, the risk of clogging is increased due to the inclined cutting edges of the scoops, since these inclined cutting edges may squeeze the material to be cut. Softer vegetables, such as half-cooked potatoes, which are used e.g. for producing "Berner Bosti" (fried potatoes Bernese style), cannot by cut by means of the known grater to the extent which would be desirable.

Another fruit and vegetable slicer is known from the DE-PS No. 22 60 358. The kitchen grater shown and described in this reference includes a frame with rectangular holes, and a plurality of teeth curve downwardly into these holes. Further teeth are provided at the back side of the kitchen grater.

A household cutting utensil for the cutting of French fried potatoes is also known from the German utility Model No. 19 91 402. In this utensil, a knife is bent rectangularly in wave shaped fashion and is disposed transversely to the direction of cutting. This knife is fastened to the opposite longitudinal strips of the kitchen utensil. Due to the size of the knives and the thickness of their blades, this utensil is not well suited for cutting fruits and vegetables.

A so-called slicer with wave-shaped surface is also known from practice, in which a knife, bent in wave-shaped fashion and mounted obliquely to the direction of cutting, is fastened on a rear support plate. The knives of this slicer also are relatively large and have relatively large blade thickness.

When cutting fruits and vegetables, it is often desireable to produce strips that are as thin as possible. If one wants to cut these strips by means of U-shaped knives there is the problem that the side portions of the knives penetrate through the vegetables. In view of the plurality of such side portions necessary for such a fruit and vegetable grater, the sum of the thicknesses of the side portions may be so large that the cutting resistance is increased, and, also, the risk of clogging the knives by the already cut strips is considerably indreased. However, solving these problems by simply reducing the blade thickness creates new problems; and, in particular, reduces the stability of the row of knives. These contradictory requirements were taken into account for the first time with this invention.

SUMMARY OF THIS INVENTION

The present invention is based on the task of providing a kitchen utensil which can be used for cutting vegetables, in particular raw and half-raw potatoes, into strips and by means of which it is possible to cut, in a simple and fast manner, strips which are ready for use, in particular for the purpose of producing fried potatoes Bernese style.

In accordance with the invention, this task is solved by the features that the knives are constructed as double edged knives each knife having a pair of opposed cutting edges and a pair of inside surfaces. The cutting edges extend in a transverse direction, perpendicular to the cutting direction, and the inside surfaces of the knives extend in a longitudinal direction, parallel to the cutting direction.

On the basis of this solution, it is possible to adequately cut vegetables, as for instance potatoes, into strips in a simple and fast manner. Morever, said solution permits a space-saving structural design of the kitchen utensil, since strips are now cut during the forward movement as well as during the return movement and since, consequently, the same working speed can be achieved by a number of knife rows which is only half as large as in the case of the prior art. The inside surfaces of the knives, extending parallel to the direction of cutting, advantageously provide the possibility of cutting even half-raw potatoes without any problems, since, during the initial cutting phase, the potato strips are not yet subjected to any transverse forces. The slide surfaces arranged on both sides of the knife rows further promote easy cutting, since the potato can be moved rapidly over the rows of knives. This has the effect that the force required for moving the potato over the cutting edges is reduced so that potatoes, especially also half-raw potatoes, are not destroyed by excessive holding forces before the potato has been fully cut.

It will be particularly advantageous when two rows of knives are provided. This will have the effect that, after a potato, for example, has been fully moved over both rows of knives, the underside of the potato will almost be flat again so that almost identical strips are cut during each forward and return movement of the potato over rows of knives.

Furthermore, it is also advantageous that each of the cutting edges of the knives has the shape of an annular segment. This has the effect that a cylinderlike arcuate surface is created on one side of the potato strips. During a following browning of the potato strips, this will have the effect that the sides of the potato strips facing the bottom of the pan will, in most cases, be the arcuate side so that uniform browning of the potatoes will occur without any premature excessive browning of protuding corners.

Preferably, each knife includes an end, provided on the underside of the knife, that sticks out from the plane of the base plate. This produces an advantageous result, and in particular, the half-raw potatoes can be cut such that chop like curling strips are obtained. The term knife end describes in this case the part of the knife at which the potato strip leaves the knive. The above-identified shape produces the effect that, on the one hand, the fried potatoes Bernese style will become particularly light and that, on the other hand, it will be more likely that, when the potato strips are being browned, they will contact the bottom of the pan with their cylinderlike arcuate upper side, and this will promote uniform browning. In order to obtain these advantages, it will be particularly advantageous when the underside of the knife extends along a concave line from the cutting edge to the knife end. In accordance with a further development, the cutting edges of the knives are curved and have a concave shape.

For the purpose of forming slightly helical potato strips, the thickness of each knife may be distributed asymmetrically relative to an axis extending parallel to the direction of cutting. The slide surfaces consist of smooth surfaces in accordance with an advantageous embodiment so that the potato slides on its non-cut webs during the cutting process.

For achieving even better cutting with the knives, through openings may be provided in the base plate below the knives, and these openings may widen in a cone-like fashion, from the upper side of the base plate towards the lower side thereof.

Handling of the kitchen utensil is additionally simplified by the fact that, when seen in the direction of cutting, a handle is attached to at least one end of the base plate.

It will be particularly advantageous when each transverse row of knives consists of a stamped strip of metal. In this case, it will be possible to sharpen the edges of the strip prior to the strip stamping operation so that the U-shaped cutting edges, which have been formed after the strip stamping operation, will be particularly sharp, whereby cutting of the potatoes will be facilitated.

With an alternate embodiment of the invention, the row of knives is formed of a thin metal strip including upper and lower transversely extending portions, and side portions connecting the upper and lower portions together in one piece. The metal strip has trapezoidal-type undulations and is fastened with the lower transversely extending portions in the base plate, and with the lower transversely extending portion disposed below the slide surface. The upper transversely extending portions project above the slide surfaces and, when viewed in the direction of cutting, are aligned generally parallel to the plane of the slide surface.

Preferably the upper transversely extending portions of the knives form double blade-knives, and the center of each transversely extending portion is indented toward the base plate. These indented areas create virtually no additional resistance since they deflect the cut material only after that material has been cut to a certain length so that is is more or less automatically bent.

Due to these features, it is relatively easy for a person to cut or slice material by means of a to and fro movement. In contrast, the high cutting resistance in prior fruit and vegetable slicers has led to relatively bad cutting results during the backward movement, i.e. during the backward movement less material is cut from an object than during the forward movement.

An advantageous deflection of the cut strip results from the fact that the indents of the upper transversely extending portions have approximately triangular shape, when viewed in a direction transverse to the direction of cutting.

Advantageously, the indents end at a position above the plane of the slide surfaces. This is readily sufficient for the free cutting of the knives; and morever, the deflection forces are kept very small due to the indents.

An advantageous distance between the center of an indent and the associated blades of a knife is approximately two to three times the depth of the indent. The distance from the edge of an indent to the associated adjacent blade is equal to the depth of the indent. These ratios make the cutting process especially advantageous. It is also possible to select the latter measurement, i.e. the distance from the edge of an indent to the adjacent cutting edge, somewhat larger than the depth of the indent.

According to a preferred embodiment, the width of an upper transversely extending portion is approximately equal to the width of a lower transversely extending portion.

With one embodiment, the rows of knives extend at right angles to the direction of cutting on the base plate, however, it is also possible to dispose the rows of knives obliquely to the direction of cutting. Even with this latter arrangement, the indvidual knives longitudinally extend parallel to the direction of cutting.

An especially stable mounting of the knives on the base plate can be obtained if the through openings in the base plate are limited by longitudinally extending portions, provided at the level of the rows of knives. The longitudinally extending portions of the base plate are below the upper transversely extending knives, and the lower transversely extending portions of the knives are injection molded in these longitudinally extending portions of the base plate.

The free cutting by the knives is further facilitated by the fact that the through openings in the base plate are longer than the upper transversely extending portions of the knives and terminate at a portion longitudinally spaced from the blades of the knives.

A good anchoring of the lower transversely extending portion of the knives in the longitudinally extending portions of the base plate can be achieved by providing the lower transversely extending portions of the knives with recesses for anchoring those portions in the plastic material. This good anchoring can be further improved by providing these recesses with openings for the passage of the plastic material. During the injection moulding of the fruit and vegetable slicer, the plastic material passes through these openings, producing a form-fit connection between the lower transversely extending portions of the knives and the base plate.

The fact that, when viewed in the direction of cutting, the recesses are disposed in the center of the lower transversely extending portion of the knives, further improves the anchoring of these lower transversely extending portions

BRIEF DESCRIPTION OF THE DRAWINGS

In the following, embodiments of the invention will be explained in detail on the basis of the drawings, in which:

FIG. 5 is a perspective view of a second embodiment of the invention.

FIG. 6 is an enlarged sectional view along the line VI—VI of FIG. 5.

FIG. 7 is a perspective view of a third embodiment of the invention,

FIG. 8 is an enlarged sectional view taken along line VIII—VIII of FIG. 7, and

FIG. 9 is an enlarged sectional view taken along line IX—IX of FIG. 7.

DETAILED DESCRIPTION OF THE PREFERRED EMBODIMENTS

Figure 1:
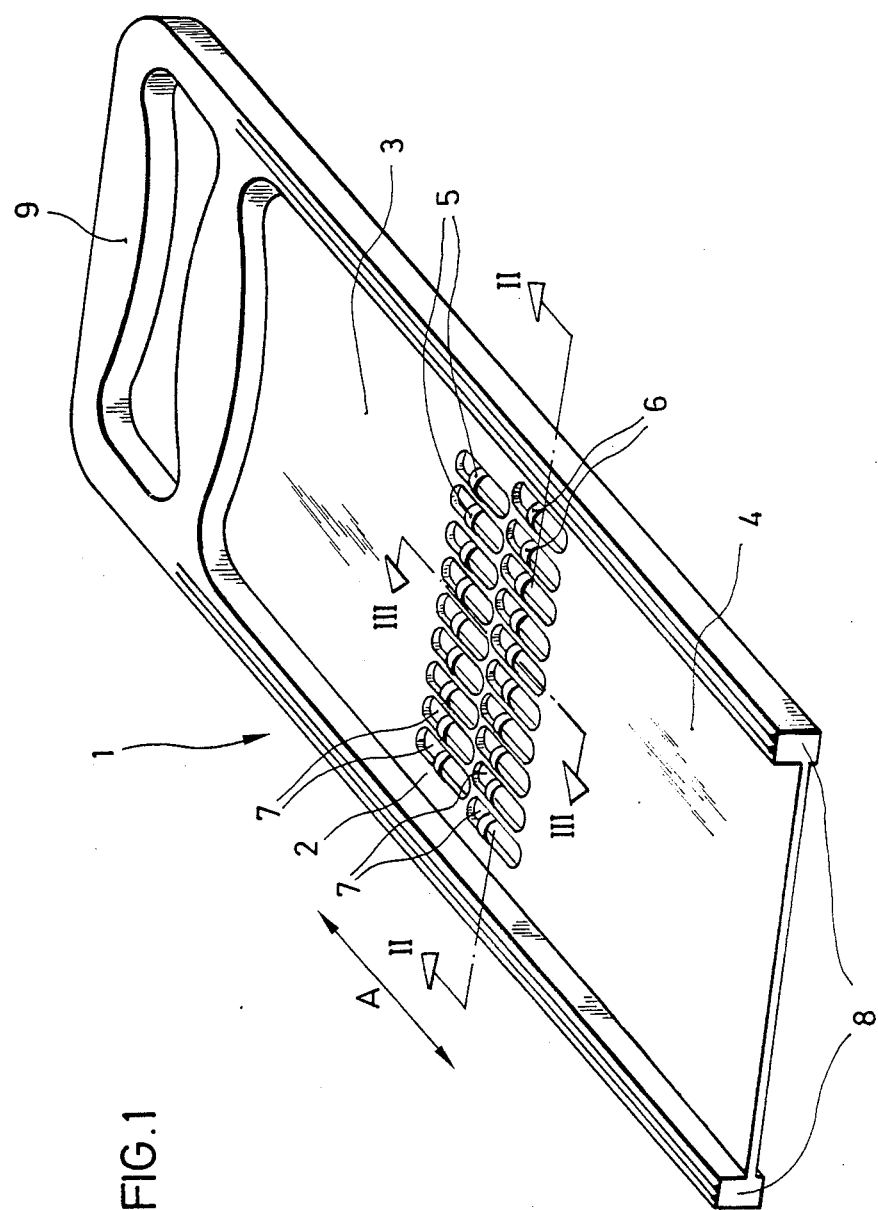
FIG. 1 is a perspective view of a first embodiment of the kitchen utensil according to the invention.

FIG. 1 shows a kitchen utensil 1 according to the invention, referred to as a "Rosti" cutter, and which comprises a flat base plate 2 having provided on the upper side thereof two slide surfaces 3 and 4.

Two rows of knives 5 and 6 are arranged between the slide surfaces 3 and 4, and these rows extend transversely across plate 2, perpindicular to the direction of cutting A. The knives 5 are displaced relative to the knives 6 in such a way that one respective knife 5 is centrally located behind the space between two knives 6. Below the knives 5 and 6, the base plate is provided with through openings 7 for guiding the potato strips to the underside of the "Rosti" cutter. Each of openings 7 has the shape of an elongated hole, and these openings widen in a cone-like fashion towards the lower side of the base-plate 2.

Guide webs 8 extend in the direction of cutting and are attached to both longitudinally sides of the base plate 2, and these guide webs terminate in a handle 9 at the "Rosti" cutter end positioned in the direction of cutting.

Figure 3:
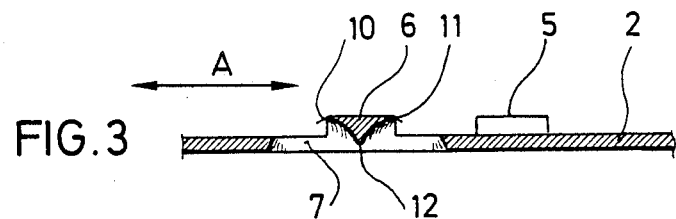
FIG. 3 is an enlarged longitudinal section through the knives along line III—III of FIG. 1.

With particular reference to FIG. 3, the knives 5 and 6 are provided with a pair of leading, cutting edges 10 and 11 and a pair of inside surfaces. The cutting edges 10 and 11 extend in a transverse direction, perpendicular to the cutting direction, and the inside surfaces of the knives extend in a longitudinal direction from those cutting edges, parallel to the cutting direction.

Figure 2:
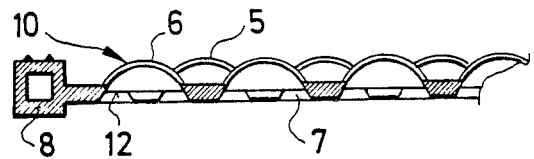
FIG. 2 is an enlarged sectional view of the kitchen utensil along line II—II of FIG. 1.

At cutting edges 10 and 11, the slope of the inside surfaces of the knives is parallel to the top surface of base plate 2; and at end edges 12 of the knives, the slope of the inside surfaces of the knives is approximately perpendicular to base plate 2. The knives 5 and 6, which are constructed in the same manner, are inclined towards the base plate 2 from the cutting edges 10 and 11 to their knife ends 12; and in particular, the inclined undersides of the knives extend along concave lines from the cutting edges 10 and 11 to the knife ends 12, approximately in the form of the inner side of a right angle bend. As will be evident from FIG. 2, the cutting edges of the knives have the shape of an annular segment in the transverse direction. Also, the width of each cutting edge at the level of the base plate 2 is approximately four times the maximum height of the cutting edge; and, for example, in the case of the embodiment described, the width of each cutting edge is approximately 8 mm.

FIG. 5 shows an additional embodiment of the present invention. This embodiment essentially corresponds to the above-described embodiment. Hence, only the special features will be described. Identical reference numerals will be used for identical and for similar structural components.

In contrast to the first embodiment, each row of knives 5 and 6 of the emobidment of FIG. 5 consists of a metal strip 13 and 14, respectively, produced by means of a stamping process. The metal strips 13 and 14, respectively, extend continuously from one guide 8 to the next. The transverse distance between two transversely neighboring knives is bridged by means of a stamped groove 15, which extends below the plane of the slide surfaces 3 and 4, i.e. below the actual cutting region.

The upper sides of the knives 5 and 6 is provided with a stamped transverse groove 16, which extends across the whole width of the kitchen utensil and which defines the downwardly inclined knife ends 12.

FIG. 6 shows a longitudinal section through the kitchen utensil of FIG. 5, and in particular, a metal strip 13 thereof. It is clearly evident that the metal strip is embedded in the base plate 2 with the lower stamped grooves 15 extending in the direction of cutting. If the kitchen utensil is made of plastic material, the metal strips 13 and 14, respectively, can be installed during the casting process.

A special advantage of the metal strips 13 and 14 is that they can be sharpened prior to the stamping process, so that the cutting edges of the knives 5 and 6, respectively, will be particularly sharp.

Figure 4:
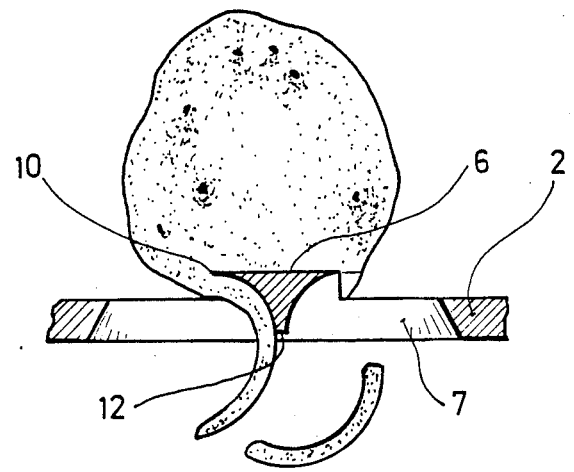
FIG. 4 shows an enlarged detail from FIG. 3, and in particular, shows a potato being sliced by a knife of the utensil.

In the following, the mode of operation of the "Rosti" cutter will be explained in detail. The "Rosti" cutter is equally suitable for cutting raw, half-raw and, to a certain extent, even cooked potatoes. The potato to be cut is, for example, inserted into a holding means, which is not shown since it is already known, and is then positioned onto the slide surface 3 with the aid of said holding means. The potato is then moved across the knives 5 and 6 in the direction of cutting A, and in the course of this process, a strip is cut off on the underside of the potato. With particular reference to FIG. 4, the strip may assume a chiplike arcuate shape depending on the type of potato—raw, half-raw or cooked—which has been used.

Although the "Rosti" cutter, and in particular, the knives, may be produced from metal, sheet metal or the like, they may also, in the case of the embodiment of FIGS. 1-4, be produced in one piece from a plastic material by means of injection molding.

The "Rosti" cutter can be used not only for cutting potatoes, but also for cutting other vegatables to prepare e.g. raw vegatable salads. The cutting edges of the knives may in this case also have a trapezoidal shape.

In contrast to the embodiments specifcally shown in the drawings, the transversely extending rows of knives may be arranged such that they are slightly inclined relative to an axis perpendicular to the direction of cutting. Even in such a case, however, preferably the inside surfaces of the knives are parallel to the direction of cutting.

With reference now to FIGS. 7-9, the fruit and vegetable slicer 101 comprises a base plate 102 on whose upper side 103 two slide surfaces 104 and 105 being in one plane are provided. Two rows of knives 106 and 107 are disposed between the slide surfaces 104 and 105 transversely to the direction of cutting A and in staggered relationship with respect to each other. The rows of knives 106 and 107 have knives with U-shaped blades 108, which project at a distance above the slide surfaces 104 and 105, and which are open towards the lower side of 109 of the base plate 102. The lower side of the knives is designed at least partly inclined towards the base plate, as shown in FIG. 8. As can be seen from FIG. 7, each row of knives includes a thin metal strip 110 with a thickness of about 1/10 mm. The metal strip 110 is formed with trapezoidal type undulation with the formation of upper transversely extending portions 111, lower transversely extending portion 112 and side portions 113 connecting together the upper and lower transversely extending portions. As can be seen especially well from FIG. 8, the lower transversely extending portions are fastened in the base plate and disposed below the slide surfaces 104, 105. As compared to this, the upper transversely extending portions 111 project above the slide surfaces 104, 105 and longitudinally extend substantially parallel to the plane of the slide surfaces 104, 105, based on the direction of cutting A.

As is clearly revealed by the drawings, each row of knives 106 and 107 has two blades, and the center of the upper transversely extending portions 111 include indents 114 that are directed toward the base plate. FIGS. 8 and 9 reveal that the indents 114 of the upper transversly extending portions 111 are formed approximately triangularly, when viewed transversely to the direction of cutting A. The indents 114 terminate at a position above the plane of the slide surfaces 104 and 105.

As can be seen especially well from FIG. 8, the distance between the center of an indent 114 and the associated blades 108 of a knife is approximately two or three times the depth of the indent 114. Measured from the edge of an indent 114, the distance to the associated adjacent blade 108 is about equal to the depth of the indent. Also, as can be understood from FIG. 7 the width of an upper transversely extending portion 111 is approximately equal to that of a lower transversely extending portion 112.

Although the rows of knives 106 and 107 may also be disposed obliquely to the direction of cutting A, preferably they extend at a right angle to the direction of cutting A on the base plate 102.

The base plate 102 itself is made of plastic material. The metal strips 110, from which the rows of knives 106 and 107 are produced, are injection moulded in the base plate 102 of the fruit and vegetable slicer 101.

For this purpose through openings 116 are formed in the base plate 102 at the level of the rows of knives 106, 107; and these openings 116 are limited by longitudinal webs 115, which are below the upper transversely extending portions of the knives 106, 107. The lower transversely extending portion 112 of the knives 106 or 107 are injection moulded into the longitudinal webs 115 of the base plate 102. Recesses 117 are disposed in the transversely extending portions 112 to better anchor portions 112 in the longitudinal webs 115 of the base plate 102. The recesses 117 are provided with openings 118, through which the plastic material can pass during injection moulding, to even better anchor portions 112 of the knives in the longitudinal webs 115 of the base plate. When viewed in the direction of cutting A, the recesses 117 and the openings 118 are idsposed in the center of the lower portions 112.

The through openings 116 are longer than the upper portions 111 of the knives 106 or 107—as is particularly shown in FIG. 8—and openings 116 terminate at portions longitudinally spaced from the blades 108 of the knives.

In the following, the mode of operation of the embodiment of FIGS. 7-9 is explained.

Vegetables can be cut into very fine strips with the represented fruit and vegetable slicer without the vegetable material being disintegrated or otherwise largely damaged.

At the beginning of the comminution process, the material to be cut is placed on the upper slide surface 104 and guided against the first row of knives 106. When the material to be cut contacts the blade 108 of the first row of knives 106, the upper portions 111 and the associated side portions 113 of the row of knives 106 penetrate into the material to be cut without bending the part already cut. Only when the front edge of the material to be cut has reached the indent 114, a partially or completely cut strip is bent downwardly at a relatively long distance from blade 108 of about two to three times the depth of the indent 114. This bending directs the cut material through openings 116 so that the strips pass through openings 116 at the lower side of the base plate 102.

When the material to be cut has passed the first row of knives 106, the material contacts the second row of knives 107, which is disposed in staggered relationship with respect to the first row of knives 106. Now, additional strips of material are cut in the same fashion as described above.

If the material to be cut is then on the lower slide surface 105, it is again guided against the row of knives 107 by means of a pulling movement of the arm, but now in the opposite direction. Due to the extremely low cutting resistance, the material rests completely on the slide surface 105 and its rear edge is not lifted. Since the strips cut during the forward movement have already passed through openings 116, these openings are now free for the passage of the strips cut druing the back movement. After the material to be cut has passed the row of knives 107, further strips are cut from the material to be cut at the row of knives 106 in the same fashion as described above.

I claim:

1. A utensil for cutting food materials into strips comprising
    a base plate including upper and lower sides, and forming a multitude of through openings extending through the base plate; the upper side of the base plate being substantially planar, having longitudinal and transverse axes, and further having front and back longitudinally spaced apart slide surfaces; and
    a plurality of rows of knives, each row transversely extending across the base plate between the front and back slide surfaces; each knife being connected to the base plate, extending over a respective one of the through openings, and including a front inside surface and a back inside surface;
    each front inside surface including (i) a front U-shaped cutting edge projecting above the front and back slide surfaces, and (ii) a lower end edge, the front inside surface having a substantially concave shape between the front and lower end edges thereof; the front inside surface having a slope at the front cutting edge that is substantially parallel to the upper side of the base plate, and having a slope at the lower end edge that is substantially perpendicular to the upper side of the base plate;

each back inside surface including (i) a back U-shaped cutting edge projecting above the front and back slide surfaces, and (ii) a lower end edge; the back inside surface having a slope at the back cutting edge that is substantially parallel to the upper side of the base plate, and having a slope at the lower end edge of the back inside surface that is substantially perpendicular to the upper side of the base plate.

2. A utensil according to claim 1, wherein the plurality of rows of knives includes two rows of knives.

3. A utensil according to claim 1, wherein each of the lower end edges projects below the upper side of the base plate 4. A utensil to claim 1, further including a handle attached to a longitudinal end of the base plate.

5. A utensil according to claim 1, wherein the through openings widen downwardly outwardly from the upper side of the base toward the lower side thereof.

6. A utensil according to claim 1, wherein each of the slide surfaces consists of a smooth surface.

7. A utensil according to claim 1, wherein the knives are integrally connected to the base plate.

8. A utensil for cutting fruits and vegetables into strips, comprising:

a base plate including (i) an upper side having longitudinal and transverse axes, and further having front and back longitudinally spaced apart slide surfaces, and (ii) a multitude of through openings extending through the base plate;

at least a first row of knives transversely extending across the base plate between the front and back slide surfaces; each knife being connected to the base plate, extending over a respective one of the through openings, and including front and back U-shaped cutting edges projecting above the front and back slide surfaces; and wherein the first row of knives is formed from a thin metal strip including upper transversely extending portions, lower transversely extending portions, and side portions connecting together the upper and lower transversely extending portions; said metal strip is secured in the base plate, with the lower transversely extending portions being located at a level below the front and back slide areas, and with the upper transversely extending portions being located at a level above the front and back slide areas; and each of the upper transversely extending portions defines a longitudinal axis parallel to the longitudinal axis of the upper side of the base plate.

9. A utensil according to claim 8, wherein:

the front and back slide surfaces are co-planar surfaces;

each of the upper transversely extending portions portions is parallel to the front and back slide surfaces, and includes front and back transversely extending cutting edges; and each of the upper transversely extending portions inlcudes an indented section, centrally located between the front and back cutting edges of the upper transversely extending portion, the indented section extending downward toward the base plate.

10. A utensil according to claim 9, wherein the indented sections form generally triangularly shaped, longitudinally extending recesses.

11. A utensil according to claim 9, wherein the indented sections are located entirely above the slide surfaces.

12. A utensil according to claim 9, wherein:

each indented section includes a front edge, a back edge and a central area longitudinally located midway between the front and back edges of the indented section;

the central area of each idented section is located at a level below the front and back edges of the indented section, the distance between the central area of each indented section and the level of the front and back edges of the indented section defining the depth of the indented section;

the front cutting edge of each upper transversely extending portion is spaced from the central area of the indented section of the upper transversely extending portion a distance between approximately two to three times the depth of the indented section; and the back cutting edge of each upper transversely extending portion is spaced from the central area of the indented section of the upper transversely extending portion a distance between approximately two to three times the depth of the indented section.

13. A utensil according to claim 9, wherein:

each indented section includes a front edge, a back edge and a central area longitudinally located midway between the front and back edges of the indented section;

the central area of each indented section is located at a level below the front and back edges of the indented section, the distance between the central area of each indented section and the level of the front and back edges of the indented section defining the depth of the indented section;

the front cutting edge of each upper transversely extending portion is spaced from the front edge of the indented section of the upper transversely extending portion a distance approximately equal to the depth of the indented section; and the back cutting edge of each upper transversely extending portion is spaced from the back edge of the indented section of the upper transversely extending portion a distance approximately equal to the depth of the indented section.

14. A utensil according to claim 8, wherein:

each of the upper transversely extending portions has a first width;

each of the lower transversely extending portions has a second width;

said first and second widths are equal.

15. A utensil according to claim 8, further including a second row of knives transversely extending across the base plate behind the first row of knives, the knives of the second row being staggered relative to the knives of the first row.

16. A utensil according to claim 8, wherein the first row of knives is parallel to the transverse axis of the upper side of the base plate.

17. A utensil according to claim 8, wherein the base plate is made of a plastic material.

18. A utensil according to claim 8, wherein:

the base plate further includes a multitude of longitudinal webs, said webs longitudinally extending alongside the through openings and separating the through openings from each other;

each upper transversely extending portion of the metal strip extends over a respesctive one of the through openings; and the lower transversely extending portions of the metal strip are embedded in the longitudinal webs of the base plate.

19. A utensil according to claim 18, wherein:

each through opening includes a front edge and a back edge;

each upper transversely extending portion includes a front edge and a back edge;

the front edge of each through opening is forward of the front edge of the upper transversely extending portion that extends over the through opening; and the back edge of each through opening is rearward of the back edge of the upper transversly extending portion that exceeds over the through opening.

20. A utensil according to claim 8, wherein each of the lower transversely extending portions includes a recess to help anchor the lower transversely extending portion in the base plate.

21. A utensil according to claim 20, wherein each of the lower transversely extending portions further include an opening in communication with the recesses to conduct plastic material through said lower transversely extending portions.

22. A utensil according to claim 21, wherein:

each lower transversely extending portion includes a front edge and a back edge;

the opening in each lower transversely extending portion is centrally located between the front and back edges of the lower transversely extending portion.

* * * * *

UNITED STATES PATENT AND TRADEMARK OFFICE
CERTIFICATE OF CORRECTION

PATENT NO. : 4,790,488

DATED : December 13, 1988

INVENTOR(S) : Alfred Borner

It is certified that error appears in the above-identified patent and that said Letters Patent is hereby corrected as shown below:

Column 2, line 12: "indreased" should read as --increased--

Column 3, line 65: "is is" should read as --it is--

Column 4, line 68: "portions" should read as --portions.--

Column 6, line 62: "specifcally" should read as --specifically--

Column 8, line 2, "idsposed" should read as --disposed--

Column 8, line 44: "druing" should read as --during--

UNITED STATES PATENT AND TRADEMARK OFFICE
CERTIFICATE OF CORRECTION

PATENT NO. : 4,790,488

DATED : December 13, 1988

INVENTOR(S) : Alfred Borner

It is certified that error appears in the above-identified patent and that said Letters Patent is hereby corrected as shown below:

Column 9, line 21, Claim 4: "utensil to" should read as --utensil according to--

Column 9, lines 62-63, Claim 9: "portions portions" should read as --portions--

Column 9, line 67, Claim 9: "inlcudes" should read as --includes--

Column 10, line 14, Claim 12: "idented" should read as -- indented--

Column 11, line 7, Claim 18: "respesctive" should read as --respective--

Signed and Sealed this

Twelfth Day of June, 1990

Attest:

*Attesting Officer*

HARRY F. MANBECK, JR.

*Commissioner of Patents and Trademarks*